United States Patent
Taylor, Sr. et al.

(10) Patent No.: US 6,220,952 B1
(45) Date of Patent: Apr. 24, 2001

(54) SPRAY NOZZLE FOR POULTRY PROCESSING

(76) Inventors: Lucian E. Taylor, Sr., 1134 KY N. 56; Benjamin B. Taylor, 351 Johnny Lee Rd., both of Calhoun, KY (US) 42327

( * ) Notice: Subject to any disclaimer, the term of this patent is extended or adjusted under 35 U.S.C. 154(b) by 0 days.

(21) Appl. No.: 09/543,591

(22) Filed: Apr. 5, 2000

Related U.S. Application Data

(60) Provisional application No. 60/148,678, filed on Aug. 13, 1999.

(51) Int. Cl.[7] ................................................. A22B 7/00
(52) U.S. Cl. ................................................. 452/173; 452/123
(58) Field of Search .................................... 453/173, 123

(56) References Cited

U.S. PATENT DOCUMENTS

| | | |
|---|---|---|
| 1,335,267 | 3/1920 | Ambrose et al. . |
| 1,790,908 | 2/1931 | Fitts . |
| 2,723,421 | 11/1955 | Smith et al. . |
| 2,738,547 | 3/1956 | Zebarth . |
| 3,803,669 | 4/1974 | Dillon . |
| 4,557,016 | 12/1985 | Markert . |
| 5,041,054 | 8/1991 | Van Den Niewelaar et al. . |
| 5,178,579 | 1/1993 | Simmons . |
| 5,482,503 | 1/1996 | Scot et al. . |

FOREIGN PATENT DOCUMENTS

| | | |
|---|---|---|
| 258501 | 4/1963 | (AU) . |

*Primary Examiner*—Willis Little
(74) *Attorney, Agent, or Firm*—Richard C. Litman

(57) ABSTRACT

A spray nozzle provides for the efficient washing or rinsing of the eviscerated body cavity of poultry during processing operations. The nozzle is formed monolithically of a single block of material, such as food grade high density polyurethane plastic or other suitable material. The nozzle body has a single axial passage extending from a threaded attachment end to terminate within the body near the opposite distal end. A series of three orifices are provided, with each orifice having an elongate opening. The result is an efficient and thorough wash pattern, with the central orifice producing a liquid stream disposed generally axially relative to the nozzle, and the two lateral passages producing generally circumferentially and upwardly disposed spray patterns to wash down essentially the entire body cavity of the poultry and to reduce rejection of poultry due to residual foreign matter remaining within the cavity after evisceration and washing.

17 Claims, 3 Drawing Sheets

SPRAY NOZZLE FOR POULTRY PROCESSING

REFERENCE TO RELATED PATENT APPLICATION

This application claims the benefit of U.S. Provisional Patent Application Ser. No. 60/148,678 filed on Aug. 13, 1999.

BACKGROUND OF THE INVENTION

1. Field of the Invention

The present invention relates generally to automated equipment used in the food processing industry, and more specifically to an improved spray or wash nozzle for washing the interior body cavity of poultry (chickens, turkeys, geese, etc.) during processing. The present spray nozzle provides plural upwardly radiating spray paths as well as an outwardly radiating spray path, to provide more thorough washing of the interior body cavity of the animal, and fewer rejections of such products upon inspection.

2. Description of the Related Art

Increasing consumption has necessitated the automation of most aspects of the food processing industry, from raising animals for meat to killing and processing those animals for consumers. This is particularly true in the poultry industry (defined as incorporating not only chickens, but turkeys, geese, and any other birds raised for food consumption, for the purposes of the present disclosure).

Such birds are relatively small in comparison with most mammals raised for food, and thus a larger number of such birds (particularly chickens) are produced and consumed per capita. Accordingly, it is critical that the processing of such birds be automated to the greatest extent possible. This is true of such steps as the cleaning and washing of the birds, as well as evisceration and other steps. A conventional procedure after the evisceration of the birds, is to wash the internal body cavity to remove any undesirable foreign matter which may still reside in the cavity. This is generally done by an automated process in which a spray nozzle is inserted into the body cavity and the cavity is flushed out with water. However, such a washing or flushing technique is not perfect, and conventional spray apparatus used for such purpose often leave some undesirable residue within the cavity, necessitating the rejection of the animal when it is inspected further along the process.

Accordingly, a need will be seen for a spray nozzle for use in the internal washing and cleaning of poultry products during processing, which nozzle provides greater efficiency than conventional apparatus used for the purpose. The present nozzle includes three separate orifices, with a central orifice providing a generally radial spray pattern and two radially displaced orifices which provide a generally upward and radially outward spray pattern. The result is greater cleaning and washing efficiency than conventional nozzles have provided in the past.

A discussion of the related art of which the present inventor is aware, and its differences and distinctions from the present invention, is provided below.

U.S. Pat. No. 1,335,267 issued on Mar. 30, 1920 to Jennings G. Ambrose et al., titled "Sprinkler," describes a sprinkler head or nozzle for use as a lawn and garden sprinkler. The device includes a series of three slotted orifices, with each of the orifices extending about a part of the circumference of the circular nozzle head. The upper and lower orifices are at an angle to the diameter, but all of the orifices provide a radial spray pattern, unlike the central orifice of the present nozzle. Such a purely radial pattern is desirable in watering a lawn or the like, but is undesirable in the environment of the present invention, where some vertical spray component is required. Also, as the Ambrose et al. nozzle is not intended for use in the food processing industry, no disclosure is made of the use of food grade materials in the construction of the Ambrose et al. nozzle.

U.S. Pat. No. 1,790,908 issued on Feb. 3, 1931 to Charles K. Fitts, titled "Nozzle Tip," describes a nozzle having an orifice pattern comprising a central elongated orifice with lateral orifices to each side oriented substantially ninety degrees to the central orifice. The Fitts nozzle provides a spray pattern generally coaxial with the axis of the nozzle, rather than radiating from the nozzle, as is required in the environment of the present nozzle. Other nozzles for use in other environments are also known, but are not suitable for use in the food industry.

U.S. Pat. No. 2,723,421 issued on Nov. 15, 1955 to George F. Smith et al., titled "Apparatus For The Internal Cleaning Of Dressed Turkeys Or Other Poultry," describes a mechanism incorporating a series of spray nozzles for the internal washing or flushing of the body cavity of a bird being processed. However, the spray pattern is not at all similar to that provided by the present spray nozzle. The Smith et al. nozzle comprises a series of relatively small, circular ports radiating from a pipe, with a cap having a series of holes therein providing an essentially coaxial flow. In contrast, the present spray nozzle provides a relatively flat and high stream radiating from the central orifice, with the two lateral orifices providing upward and radially outward sprays to flush essentially the entire cavity of the bird.

U.S. Pat. No. 2,738,547 issued on Mar. 20, 1956 to Ralph S. Zebarth, titled "Poultry Treating Apparatus," describes an automated conveyor type system with wash apparatus disposed exteriorly of the birds being processed. One of the wash or spray nozzles is positioned beneath the birds as they travel the conveyor, and is adapted to spray water upwardly into the eviscerated body cavity of the bird. Accordingly, the spray is directed in an essentially coaxial pattern, and does not spray radially outwardly from the nozzle, as is the case with the present spray nozzle which is positioned within the body cavity during the wash operation.

U.S. Pat. No. 3,803,669 issued on Apr. 16, 1974 to Janus J. Dillon, titled "System For Automatically Washing The Interior Of Fowl Carcasses," describes a mechanism including a series of probes which are introduced into the body cavity of the birds to flush the cavities. The probes each have a series of relatively small radially disposed fluid passages, adapted to produce a relatively narrow spray path. None of the spray passages appear to be angled upwardly for flushing the upper portion of the cavity, as provided by the two lateral passages of the present spray nozzle invention.

U.S. Pat. No. 4,557,016 issued on Dec. 10, 1985 to Heinrich W. Markart, titled "Washing Apparatus For The Internal Rinsing Of Poultry Carcasses," describes a spray assembly wherein the orifices are apparently downwardly oriented. This orientation does nothing to rinse the upper portions of the body cavity, whereas the present spray nozzle with its upwardly oriented lateral orifices or passages, directs a water spray not only radially outwardly from the nozzle, but also upwardly to flush essentially the entire body cavity of the poultry being processed.

U.S. Pat. No. 5,041,054 issued on Aug. 20, 1991 to Adrianus J. van den Nieuwelaar, titled "Device And Method For Washing Poultry," describes a mechanism having a spray nozzle with a series of radially disposed ribs extending therefrom for capturing membranes remaining in the body cavity of the poultry. The spray nozzle itself includes a series of relatively small, circular passages which would spray relatively narrow jets of water, unlike the broad spray pattern of the present nozzle.

U.S. Pat. No. 5,178,579 issued on Jan. 12, 1993 to Lacy Simmons, titled "Poultry Washer," describes a washing apparatus comprising a bottle-like washer nozzle having a series of tangentially disposed jets or orifices therearound. The nozzle is spun by the reactive force of the water exiting the orifices when the system is in operation. As the orifices are tangentially disposed, rather than upwardly or downwardly disposed relative to the axis of the nozzle, a relatively large number of such orifices is required for the Simmons device. The present nozzle, with its three radially disposed nozzles, two of which produce a relatively wide stream of flow upwardly relative to the nozzle axis, provides a much more efficient means of thoroughly and completely rinsing the interior body cavity of poultry.

U.S. Pat. No. 5,482,503 issued on Jan. 9, 1996 to Richard Scott et al., titled "Apparatus For Washing Poultry Carcasses," describes a machine including a plurality of washer nozzles which are selectively inserted into the body cavity of the poultry for washing the cavity. The nozzles produce a "hollow cone shaped discharge" (column 3, line 11) according to Scott et al., unlike the radially outward and upward discharge pattern of the present poultry processing spray nozzle.

Finally, Australian Patent Publication No. 258,501 published on Apr. 26, 1963 to Geoffrey Sly, titled "A New Or Improved Nozzle For Projecting Liquid From A Hose Or The Like," describes a two part nozzle, having a pair of orifices covered by a cap defining a plenum and having a single elongate orifice therein. The resulting spray pattern atomizes the liquid as it leaves the outer orifice, according to the specification. This is unsuitable for use as a wash or rinse nozzle, where streams of liquid water are required to impart the required physical impact to wash away foreign matter.

None of the above inventions and patents, either singly or in combination, is seen to describe the instant invention as claimed.

SUMMARY OF THE INVENTION

The present invention comprises a spray nozzle for use in the poultry processing industry, for washing or rinsing the body cavities of eviscerated birds (chickens, turkeys, geese, etc.). The nozzle is formed of a single piece of suitable material (e. g., food grade high density polyurethane plastic, etc.) and includes a single axial fluid passage with a series of orifices extending generally radially from the axial passage through the side of the nozzle. A central orifice has an elongate shape, with the long axis of the opening being parallel to the axis of the central passage. Two lateral orifices also have elongate shapes, with the major axes of their openings extending circumferentially about the body of the nozzle. The two side orifices are formed so that the axes of their passages extend angularly upwardly from the distal end of the central passage. This orifice configuration provides a plurality of streams of wash fluid or water, with the central stream extending generally outwardly from the nozzle, and the two side streams projecting upwardly to provide a thorough wash of the internal cavity of the poultry being processed.

Accordingly, it is a principal object of the invention to provide an improved spray nozzle for poultry processing, with the nozzle providing both radially outward and axially upward directional sprays for thorough washing or rinsing of the internal body cavity of poultry being processed.

It is another object of the invention to provide an improved spray nozzle formed monolithically of a single block of material, such as food grade high density polyurethane plastic or other suitable material.

It is a further object of the invention to provide an improved spray nozzle having an axial fluid passage formed therein, with the passage terminating within the body of the nozzle and communicating with a plurality of generally radially disposed orifices.

An additional object of the invention is to provide an improved spray nozzle which orifices comprise a central orifice having an elongate opening, with the major axis of the opening parallel to the axial passage within the body of the nozzle, and with a lateral orifice to each side of the central orifice, with each lateral orifice having an elongate opening with its major axis generally circumferentially disposed about the body of the nozzle.

Still another object of the invention is to provide an improved spray nozzle which passages for the lateral orifices are upwardly inclined from the bottom of the axial passage to the exterior of the body.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a spray nozzle for use in washing or rinsing out the internal body cavity of eviscerated poultry during the processing operation. The present nozzle 10 provides multidirectional streams of liquid water to thoroughly rinse and flush essentially the entire cavity C of the poultry P, as shown generally in FIG. 1, thus reducing the rate of rejection of poultry due to foreign matter remaining within the body cavity after the washing operation.

Figure 1:
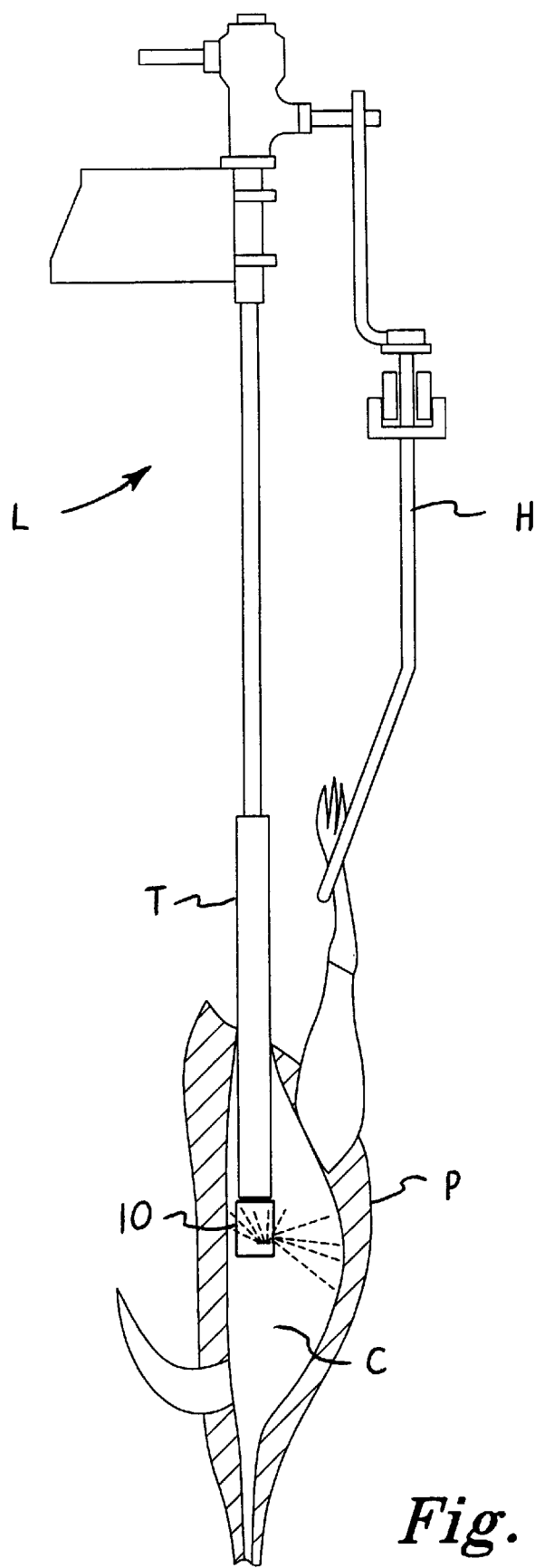
FIG. 1 is an environmental elevation view of a segment of a poultry processing line, showing the operation of the present nozzle in washing the interior cavity of poultry suspended on the line.

The use of the present spray nozzle 10 is illustrated in FIG. 1 of the drawings, with the nozzle 10 being attached to the distal end of a conventional wash fluid supply line or tube T, which is part of a conventional poultry processing line L. An eviscerated poultry bird P (which may be broadly defined as a chicken, turkey, goose, or any other type of bird which is processed for human consumption) is suspended on a hanger H on the line L, with the fluid tube T being inserted into the empty body cavity C of the poultry P. The poultry cavity wash fluid communicates with the fluid passages of the spray nozzle 10, with the nozzle 10 providing a multi-directional spray of liquid to flush out any foreign matter which may remain within the body cavity C of the poultry P after the eviscerating operation.

Figure 2:
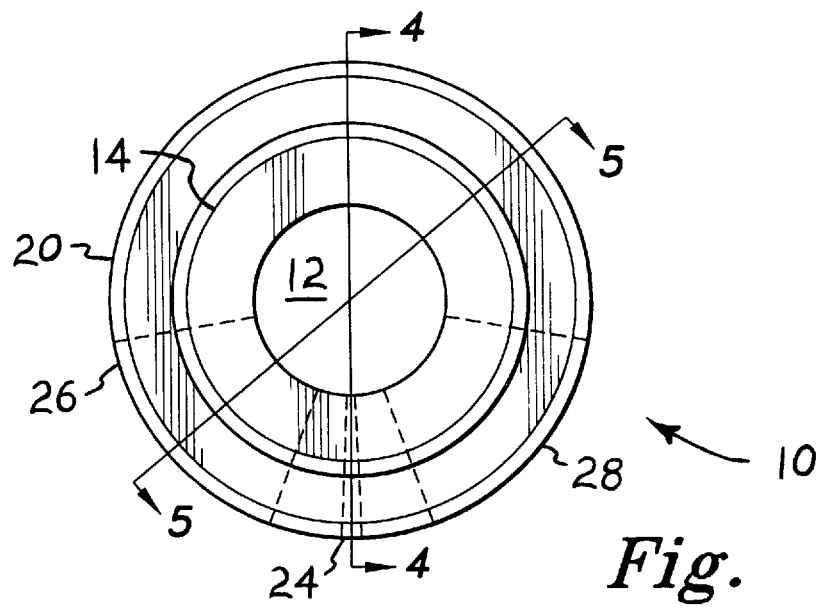
FIG. 2 is a top plan view in enlarged scale of the present nozzle, showing further details thereof.

FIGS. 2 through 5 provide more detailed views of the specific structure of the present poultry spray nozzle 10. (It will be understood that the present spray nozzle 10 may be produced in any practicable size, but that when used in processing chickens or other relatively small birds, the size will be somewhat smaller than that shown in FIGS. 2 through 5. The enlarged size shown in FIGS. 2 through 5 is to provide clarity in the drawings.) The nozzle body 10 is preferably cylindrical in shape, as shown in FIG. 2 of the drawings. A central bore or passage 12 is formed axially down the center of the nozzle body 10, from the wash fluid tube attachment end 14 of the body 10 to a distal end point 16 within the body 10, adjacent the distal outer end 18 of the nozzle body 10 opposite its attachment end 14. Thus, the central axial wash fluid passage 12 is essentially a "blind" hole, in that it does not pass completely through the nozzle body 10. However, the distal end 16 of the fluid passage 12 does communicate with the outer surface 20 of the body 10, by means of a series of generally radial wash fluid orifices which penetrate the wall 22 of the nozzle body 10, described below.

The nozzle body 10 includes a series of three orifices or outlet passages, respectively a first or central passage 24 and laterally spaced passages 26 and 28 arcuately spaced to each side of the first or central passage 24. The first through third outlet passages 24 through 28 extend generally radially from the distal end 16 of the central axial fluid passage 12, through the wall 22, and outwardly through the outer surface 20 of the nozzle body 10.

Figure 3:
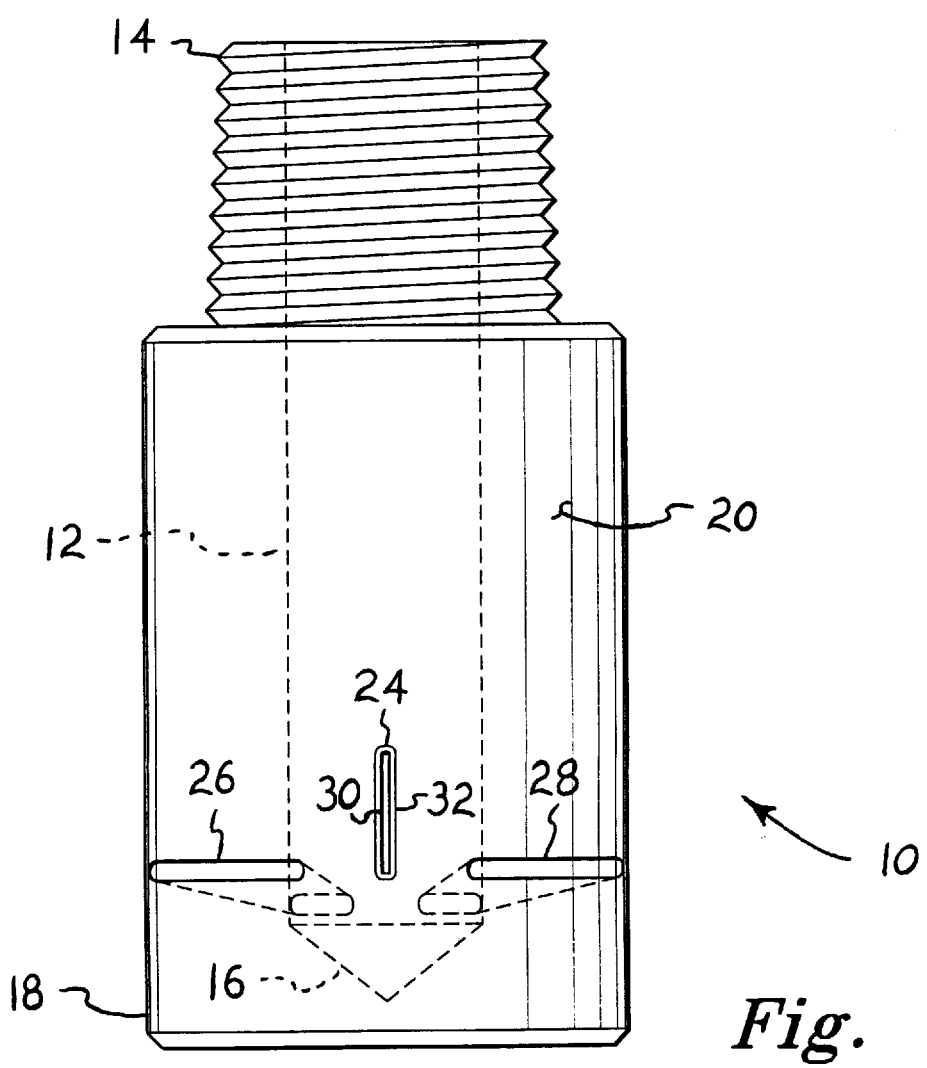
FIG. 3 is a front elevation view in enlarged scale of the nozzle, showing details of the orifices or outlets thereof.

Each outlet passage 24 through 28 has a relatively wide, thin oval cross sectional shape, as is clearly shown in FIG. 3 of the drawings. The major axis of the first passage 24 is aligned axially with the length of the axial central fluid passage 12, while the major axes of the second and third passages 26 and 28 are disposed generally circumferentially about the wall 22 of the nozzle body 10, or at right angles to the first passage 24 positioned therebetween. The outlet passages 24 through 28 are relatively narrow, having a minimum width of only about one sixteenth of an inch, although other dimensions may be used as desired according to the size of the poultry being processed, the corresponding size of the nozzle 10, the wash fluid pressure and volume being supplied, etc.

The first passage 24 is also slightly widened from its innermost point 30 to its exit 32 at the outer surface 20 of the nozzle body 10. (The wider outlet end 32 and narrower inlet end 30 are shown in FIG. 3 of the drawings, by the two concentric outlines for the first or central fluid passage 24.) This provides a spray pattern which widens as it travels from the central outlet passage 24, to provide a wider area of wash fluid contact when the fluid hits the wall of the body cavity C of the poultry P during wash operations. This widening of the central outlet passage 24 is relatively small, with approximately one half degree of dispersion between the walls of the outlet passage 24 being suitable. (Other diverging angles may be provided as desired, or the first outlet 24 may be made with its walls parallel, if so desired.)

The opposed second and third wash fluid outlets 26 and 28 each extend arcuately about the circumference of the nozzle body 10, as indicated in the top plan view of FIG. 2 and other drawing Figures. The arcuate extent of the second and third outlet passages 26 and 28 is preferably on the order of sixty degrees, with the innermost edge of each lateral passage 26 and 28 (i. e., the edge closest to the center outlet passage 24) being spaced arcuately from the central passage 24 by about twenty degrees. This substantially semicircumferential span for the three passages 24 through 28 provides a very wide spray pattern, which with the divergence of the central or first outlet passage 24, provides a nearly unbroken semicircumferential stream exiting the distal end 18 of the spray nozzle 10. It will be seen that other spacing and/or dimensions for these outlet passages 24 through 28, and/or a different number of such passages, may be provided if so desired.

Figure 4:
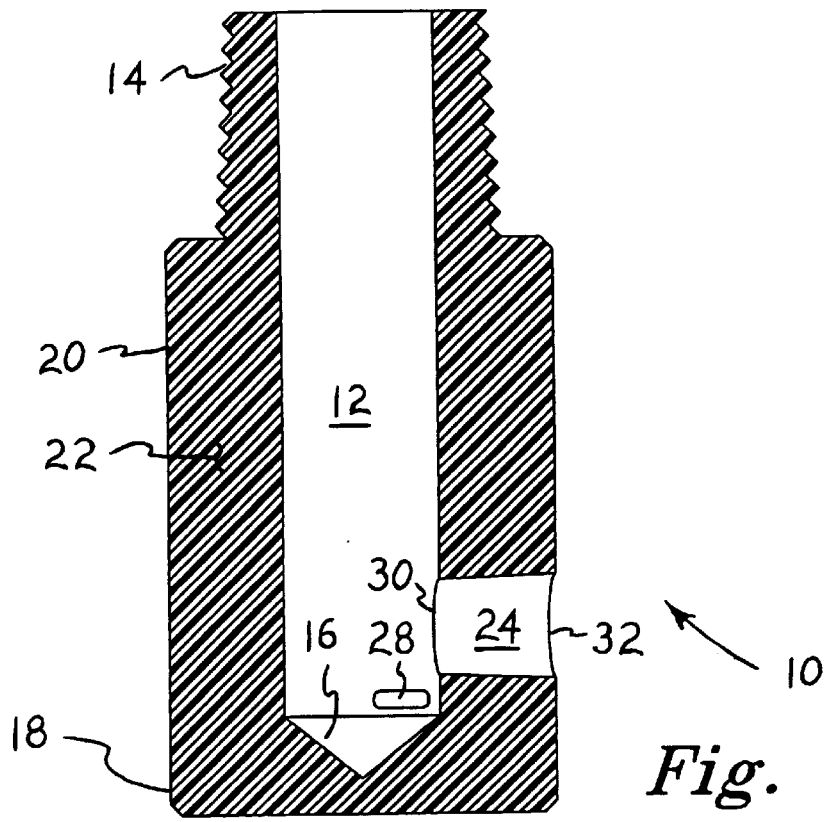
FIG. 4 is an elevation view in enlarged scale in section along line 4—4 of FIG. 2, showing the internal configuration of the central orifice.
Figure 5:
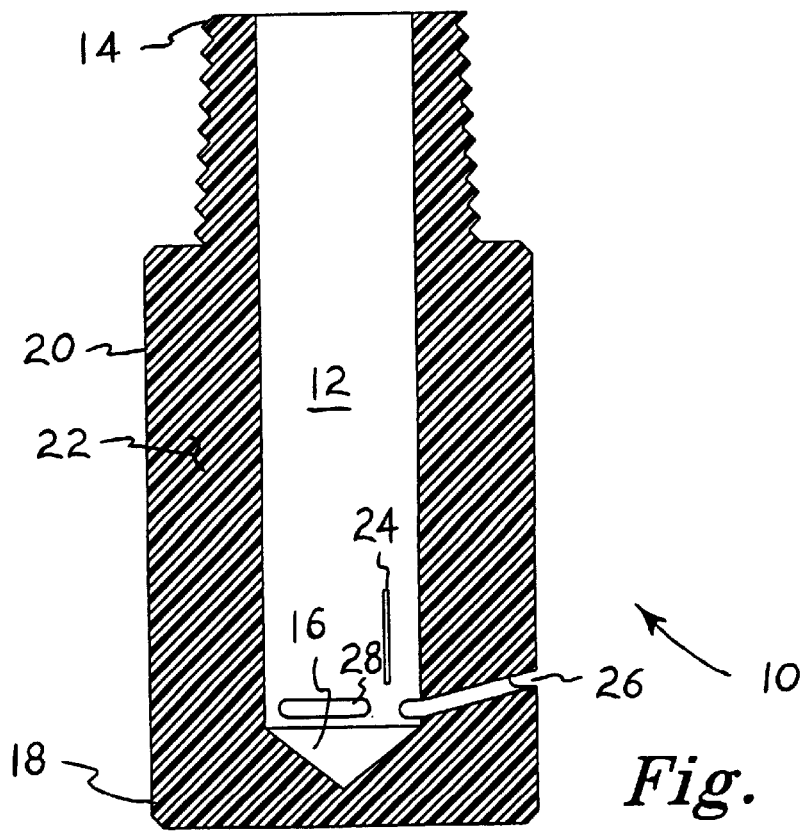
FIG. 5 is an elevation view in enlarged scale in section along line 5—5 of FIG. 2, showing the internal configuration of one of the lateral orifices.

The two lateral passages 26 and 28 do not extend straight out from the distal end 16 of the central passage 12, but are somewhat upwardly inclined, as shown in FIGS. 3 and 4 of the drawings. This upward and outward inclination is preferably on the order of thirty five degrees from a diametric plane through the nozzle body 10. This angle of inclination is exemplary, and other angles (or none) may be used as desired. The upward angle of the lateral passages 26 and 28 distributes the wash fluid upwardly into the uppermost portion of the poultry body cavity C, unlike other spray nozzles of the prior art which produce a spray either downwardly along the axis of the nozzle, or purely radially outwardly.

The present spray nozzle 10 is preferably formed monolithically from a single, unitary homogeneous mass of material, in order to preclude joints, seams, etc. between components which could trap foreign matter. The present nozzle 10 is preferably formed of food grade material, i. e., material which is approved for use in the food processing environment and which precludes contamination of any food product with which it may come in contact. Ultra high molecular weight plastic material, such as high density polyurethane, has been found to be suitable for the manufacture of the present spray nozzle 10, but other materials may be used as desired, including non-plastic materials and metals such as corrosion resistant (i. e., "stainless") steel.

In summary, the present spray nozzle for use in flushing or washing the internal body cavities of poultry products during processing, provides a significant advance in the state of the art by means of the novel configuration of the multiple outlet passages. The ninety degree orientation of the generally axially or vertically disposed central passage, relative to the generally circumferentially or horizontally disposed lateral passages to each side of the central passage, result in a significantly improved spray pattern which provides for the distribution of wash fluid throughout essentially the entire body cavity of poultry as the spray deflects within the body cavity during the internal wash operation. This results in fewer rejections of poultry due to contaminants remaining in the body cavity, and thus greater efficiency and productivity on the processing line.

It is to be understood that the present invention is not limited to the sole embodiment described above, but encompasses any and all embodiments within the scope of the following claims.

We claim:

1. A spray nozzle for flushing the interior body cavity of eviscerated poultry during processing operations, comprising:

a generally cylindrical nozzle body for inserting into the body cavity of eviscerated poultry;

said nozzle body having an attachment end, a distal end opposite said attachment end, and an outer surface;

a central poultry cavity wash fluid passage extending axially from said attachment end of said nozzle body and having a distal end terminating within said nozzle body adjacent said distal end thereof;

said outer surface and said axial passage of said nozzle body defining a nozzle body wall therebetween;

first, second, and third cavity wash fluid outlet passages, for spraying a volume of flushing liquid into the interior body cavity of the eviscerated poultry said first of said outlet passages is disposed between said second and said third outlet passages;

said wash fluid outlet passages extending from said distal end of said central fluid passage, generally radially outwardly through said nozzle body wall and through said outer surface of said nozzle body; and said outlet passages being disposed generally circumferentially about said nozzle body.

2. The spray nozzle according to claim 1, wherein each of said outlet passages has an elongate oval cross sectional shape.

3. The spray nozzle according to claim 1, wherein said first outlet passage has a major axis aligned axially with said axially disposed central fluid passage.

4. The spray nozzle according to claim 1, wherein said second and said third outlet passage each have a major axis aligned generally circumferentially about said nozzle body.

5. The spray nozzle according to claim 1, wherein said first outlet passage has an inlet end and an outlet end opposite said inlet end, with said outlet end being wider than said inlet end.

6. The spray nozzle according to claim 1, wherein said first through said third outlet passage encompass a substantially semicircumferential span about said nozzle body.

7. The spray nozzle according to claim 1, wherein said second and said third outlet passages are each angled upwardly and outwardly from said distal end of said central fluid passage to said outer surface of said nozzle body.

8. The spray nozzle according to claim 1, wherein said nozzle body is formed as a unitary, monolithic structure from a single homogeneous mass of material.

9. The spray nozzle according to claim 1, wherein said nozzle body is formed of food grade material.

10. The spray nozzle according to claim 1, wherein said nozzle body is formed of ultra high molecular weight polyurethane plastic.

11. A spray nozzle for poultry processing, comprising:

a nozzle body having an attachment end, a distal end opposite said attachment end, and an outer surface;

an axial fluid passage extending from said attachment end of said nozzle body and having a distal end terminating within said nozzle body adjacent said distal end thereof;

said outer surface and said axial passage of said nozzle body defining a nozzle body wall therebetween;

a first, a second, and a third outlet passage extending from said distal end of said fluid passage, generally radially outwardly through said nozzle body wall and through said outer surface of said nozzle body;

each said outlet passage having an elongate oval cross section, with said first outlet passage having a major cross section axis disposed parallel to said axial fluid passage of said nozzle body and said second and said third outlet passage each having a major cross section axis disposed generally circumferentially about said wall of said nozzle body; and said first outlet passage being disposed centrally between said second and said third outlet passage.

12. The spray nozzle according to claim 11, wherein said first outlet passage has an inlet end and an outlet end opposite said inlet end, with said outlet end being wider than said inlet end.

13. The spray nozzle according to claim 11, wherein said first through said third outlet passage encompass a substantially semicircumferential span about said nozzle body.

14. The spray nozzle according to claim 11, wherein said second and said third outlet passages are each angled upwardly and outwardly from said distal end of said central fluid passage to said outer surface of said nozzle body.

15. The spray nozzle according to claim 11, wherein said nozzle body is formed as a unitary, monolithic structure from a single homogeneous mass of material.

16. The spray nozzle according to claim 11, wherein said nozzle body is formed of food grade material.

17. The spray nozzle according to claim 11, wherein said nozzle body is formed of ultra high molecular weight polyurethane plastic.

* * * * *